US 10,704,416 B2

(12) United States Patent
Ha et al.

(10) Patent No.: US 10,704,416 B2
(45) Date of Patent: Jul. 7, 2020

(54) CONFORMAL HEAT SHIELD FOR GAS TURBINE ENGINE

(71) Applicant: UNITED TECHNOLOGIES CORPORATION, Farmington, CT (US)

(72) Inventors: Joon Ha, Glastonbury, CT (US); John P. Lucashu, Durham, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 180 days.

(21) Appl. No.: 16/034,813

(22) Filed: Jul. 13, 2018

(65) Prior Publication Data

US 2020/0018183 A1 Jan. 16, 2020

(51) Int. Cl.
*F01D 25/14* (2006.01)
*F01D 25/24* (2006.01)

(52) U.S. Cl.
CPC ......... *F01D 25/145* (2013.01); *F01D 25/243* (2013.01); *F01D 25/246* (2013.01); *F05D 2260/231* (2013.01)

(58) Field of Classification Search
CPC .... F01D 25/145; F01D 25/246; F01D 25/243; F05D 2260/231; F05D 2240/15
See application file for complete search history.

(56) References Cited

U.S. PATENT DOCUMENTS

| | | | | |
|---|---|---|---|---|
| 5,174,714 A | * | 12/1992 | Plemmons | F01D 25/145 29/888.01 |
| 5,549,449 A | * | 8/1996 | McInerney | F01D 25/14 384/413 |
| 7,614,845 B2 | * | 11/2009 | Adam | F01D 25/145 415/134 |
| 7,704,038 B2 | * | 4/2010 | Ring | F01D 25/14 415/112 |
| 8,713,944 B2 | * | 5/2014 | Bleeker | F16L 59/145 60/739 |
| 10,371,005 B2 | * | 8/2019 | Ponchak | F01D 25/145 |
| 10,519,811 B2 | * | 12/2019 | Dale | F01D 25/145 |
| 2006/0193721 A1 | * | 8/2006 | Adam | F01D 25/145 415/177 |

(Continued)

FOREIGN PATENT DOCUMENTS

| | | |
|---|---|---|
| EP | 3273014 | 1/2018 |
| EP | 3306056 | 4/2018 |

OTHER PUBLICATIONS

European Patent Office, European Search Report dated Nov. 13, 2019 in Application No. 19174137.0.

*Primary Examiner* — Woody A Lee, Jr.
*Assistant Examiner* — Brian Christopher Delrue
(74) *Attorney, Agent, or Firm* — Snell & Wilmer, L.L.P.

(57) ABSTRACT

A conformal heat shield for a gas turbine engine may comprise a first section including a first arcuate segment and a second arcuate segment circumferentially adjacent to the first arcuate segment. The first arcuate segment and the second arcuate segment may each comprise a distal metal layer including a plurality of loops extending radially outward from the distal metal layer. A proximal metal layer may be located radially inward of the distal metal layer. An insulating material may be located between the distal metal layer and the proximal metal layer. A first strap may be located through the loops.

20 Claims, 6 Drawing Sheets

(56) References Cited

U.S. PATENT DOCUMENTS

| | | | |
|---|---|---|---|
| 2012/0073299 A1* | 3/2012 | Bleeker | F02C 7/25 60/740 |
| 2013/0294900 A1* | 11/2013 | Graily | F01D 25/145 415/177 |
| 2016/0290212 A1* | 10/2016 | Sarsfield | F01N 13/1827 |
| 2018/0023417 A1* | 1/2018 | Ponchak | F01D 25/145 415/177 |
| 2018/0094545 A1* | 4/2018 | Dale | F02C 7/12 |
| 2019/0234311 A1* | 8/2019 | Morenko | F02C 7/222 |

* cited by examiner

CONFORMAL HEAT SHIELD FOR GAS TURBINE ENGINE

STATEMENT OF GOVERNMENT INTEREST

This invention was made with Government support awarded by the United States. The Government has certain rights in this invention

FIELD

The present disclosure relates to gas turbine engines and, more particularly, to conformal heat shields for gas turbine engines.

BACKGROUND

Gas turbine engines may comprise cases surrounding components such as a compressor case. In various embodiments, components of case may be coupled to each other at mating flanges. Relatively hot air may flow inside the case and relatively cool air may flow outside the case tending to induce a thermal gradient between the inner diameter of the case and the outer diameter of the case and between the mating flanges. In various embodiments, the thermal gradient tends to induce stresses within the case and the mating flanges tending thereby to reduce component lifetime.

SUMMARY

A conformal heat shield for a gas turbine engine is disclosed herein. In accordance with various embodiments, the conformal heat shield may comprise a first section including a first arcuate segment and a second arcuate segment circumferentially adjacent to the first arcuate segment. The first arcuate segment of the first section and the second arcuate segment of the first section may each comprise a first distal metal layer including a plurality of loops extending radially outward from the first distal metal layer, a first proximal metal layer located radially inward of the first distal metal layer, and an insulating material located between the first distal metal layer and the first proximal metal layer. A first strap may be located through the plurality of loops.

In various embodiments, a coupling bracket may be located over the first arcuate segment and the second arcuate segment. The coupling bracket may define a first loop orifice. A first loop of the plurality of loops may be located through the first loop orifice.

In various embodiments, the coupling bracket may comprise a first portion located over a forward portion of the first section, and a second portion located over an aft portion of the first section. The first portion of the coupling bracket may define the first loop orifice, and the second portion of the coupling bracket may define a second loop orifice. The aft portion of the first section may include a plurality of aft loops extending radially outward from the first distal metal layer. A first aft loop of the plurality of aft loops may be located through the second loop orifice.

In various embodiments, a second strap may be located over the second portion of the coupling bracket and through the first aft loop. In various embodiments, the first portion of the coupling bracket and the second portion of the coupling bracket may define, at least a portion of a coupling bracket opening. The coupling bracket opening may be located over a heat shield opening defined by the first arcuate segment and the second arcuate segment.

In various embodiments, the conformal heat shield may further comprise a second section located aft of the first section. The second section may include a first arcuate segment and a second arcuate segment circumferentially adjacent to the first arcuate segment of the second section. The first arcuate segment of the second section and the second arcuate segment of the second section may each comprise a second distal metal layer including a plurality of second loops extending radially outward from the second distal metal layer, a second proximal metal layer located radially inward of the second distal metal layer, and a second insulating material located between the second distal metal layer and the second proximal metal layer. A second strap may be located through the plurality of second loops.

In various embodiments, the first arcuate segment of the first section and the second arcuate segment of the first section may define a radially extending flange located at a forward end of the first section.

A compressor section of a gas turbine engine is also disclosed herein. In accordance with various embodiments, the compressor section may comprise a compressor case comprising a first case section including a first radially extending flange located at a forward end of the first case section and a second radially extending flange located at an aft end of the first case section. A second case section may be aft of the first case section and may include a third radially extending flange located at a forward end of the second case section. A first fastener may be located through the first radially extending flange. A second fastener may be located through the second radially extending flange of the first case section and the third radially extending flange of the second case section. A conformal heat shield may be located radially outward of the compressor case. The conformal heat shield may include a first section comprising a first arcuate segment and a second arcuate segment circumferentially adjacent to the first arcuate segment. The first arcuate segment of the first section and the second arcuate segment of the first section may each comprise a first distal metal layer including a plurality of loops extending radially outward from the first distal metal layer, a first proximal metal layer located radially inward of the first distal metal layer, and a first insulating material located between the first distal metal layer and the first proximal metal layer. A first strap may be located through the plurality of loops.

In various embodiments, a coupling bracket may be located over the first arcuate segment and the second arcuate segment. The coupling bracket may define a first loop orifice. A first loop of the plurality of loops may be located through the first loop orifice.

In various embodiments, the coupling bracket may comprise a first portion located over a forward raised portion of the first section, and a second portion located over an aft raised portion of the first section. The first portion may define the first loop orifice. The second portion may define a second loop orifice. The aft raised portion of the first section may include a plurality of aft loops extending radially outward from the first distal metal layer. A first aft loop of the plurality of aft loops may be located through the second loop orifice. In various embodiments, a second strap may be located over the second portion of the coupling bracket and through the first aft loop.

In various embodiments, the conformal heat shield may further comprise a second section located aft of the first section. The second section may include a first arcuate segment and a second arcuate segment circumferentially adjacent to the first arcuate segment of the second section. The first arcuate segment of the second section and the second arcuate segment of the second section may each comprise a second distal metal layer including a plurality of second loops extending radially outward from the second distal metal layer, a second proximal metal layer located radially inward of the second distal metal layer, and a second insulating material located between the second distal metal layer and the second proximal metal layer. A second strap may be located through the plurality of second loops.

In various embodiments, the second section of the conformal heat shield may be located radially outward of a fourth radially extending flange of the second case section. The fourth radially extending flange may be located at an aft end of the second case section.

A gas turbine engine is also disclosed herein. In accordance with various embodiments, the gas turbine engine may comprise a case structure disposed around a longitudinal axis of the gas turbine engine. A conformal heat shield may be located radially outward of the case structure. A first section of the conformal heat shield may comprise a first distal metal layer including plurality of loops extending radially outward from the first distal metal layer, a first proximal metal layer located radially inward of the first distal metal layer, and a first insulating material located between the first distal metal layer and the first proximal metal layer. A first strap may be located through the plurality of loops.

In various embodiments, a fastener may be coupled to the first strap. The fastener may be configured to allow the first strap to translate through the fastener in a first direction and prevent the first strap from translating through the fastener in a second direction opposite the first direction.

In various embodiments, the conformal heat shield may further comprise a second section located aft of the first section. The second section may comprise a second distal metal layer including a plurality of second loops extending radially outward from the second distal metal layer, a second proximal metal layer located radially inward of the second distal metal layer, and a second insulating material located between the second distal metal layer and the second proximal metal layer. A second strap may be located through the plurality of second loops.

In various embodiments, the gas turbine engine may further comprise a compressor, and the case structure may be located radially outward of the compressor.

In various embodiments, the first section of the conformal heat shield may comprise a forward raised portion, an aft raised portion, and a channel portion extending axially between the forward raised portion and the aft raised portion. The forward raised portion and the aft raised portion may be distal to the channel portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements. Accordingly, elements with like element numbering may be shown in the figures, but may not be necessarily be repeated herein for the sake of clarity.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

As used herein, "distal" refers to the direction radially outward, or generally, away from the engine longitudinal axis of the gas turbine engine. As used herein, "proximal" refers to the direction radially inward, or generally, toward from the engine longitudinal axis of the gas turbine engine. A first component that is "radially outward" or of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to references other than the engine central longitudinal axis.

Figure 1:
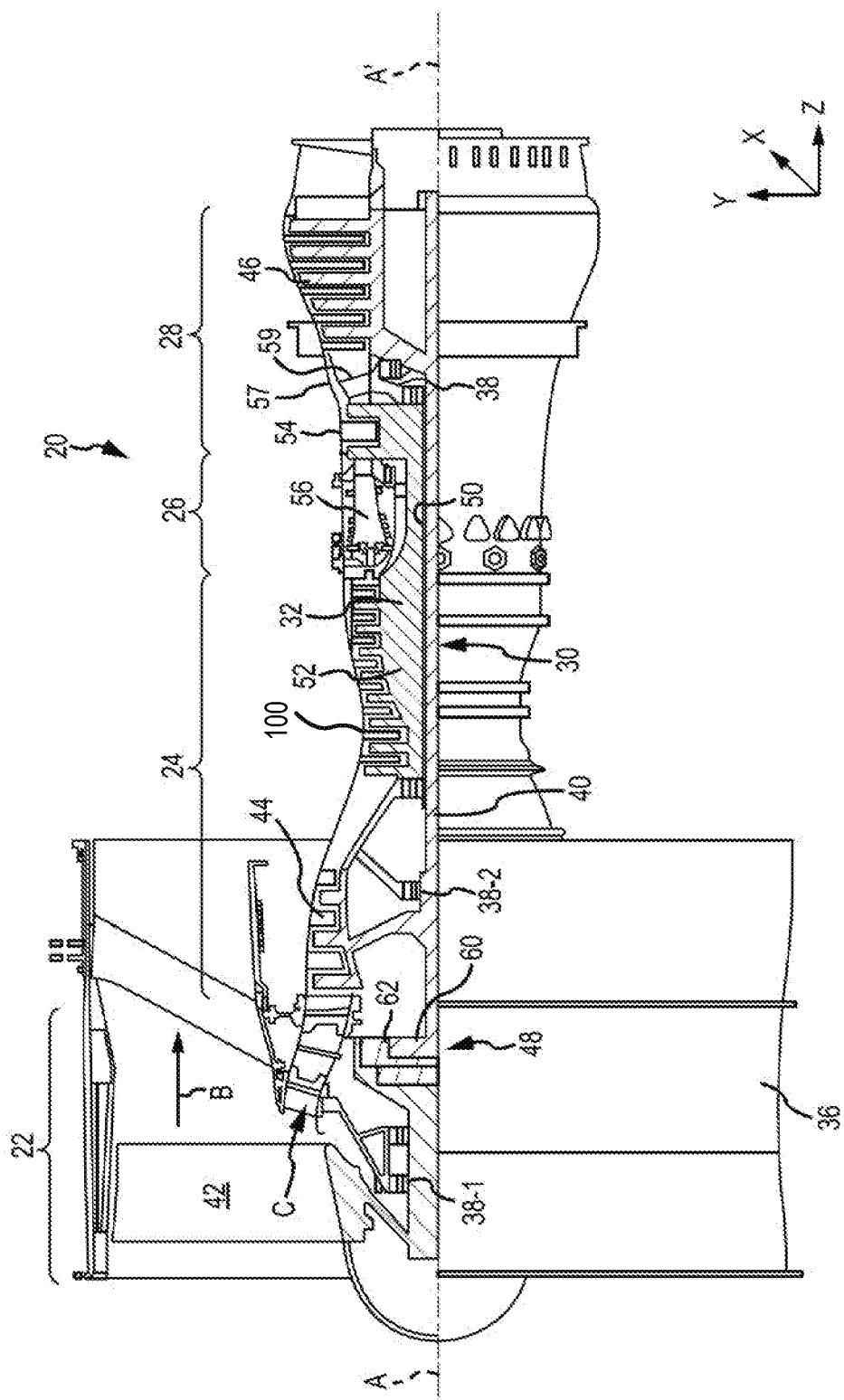
FIG. 1 illustrates a schematic cross-section of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and multi-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 62 enclosed within a gear assembly 62. Gear assembly 62 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Low pressure turbine 46, and high pressure turbine 54 rotationally drive low speed spool 30 and high speed spool 32, respectively, in response to the expansion.

In various embodiments, a compressor case 100 may surround portions of compressor section 24, for example, compressor case 100 may be located around HPC 52. compressor case 100 may be locate around engine longitudinal axis A-A'. In various embodiments, a conformal heat shield 190, with momentary reference to FIG. 3, may be located around compressor case 100.

Figure 2A:
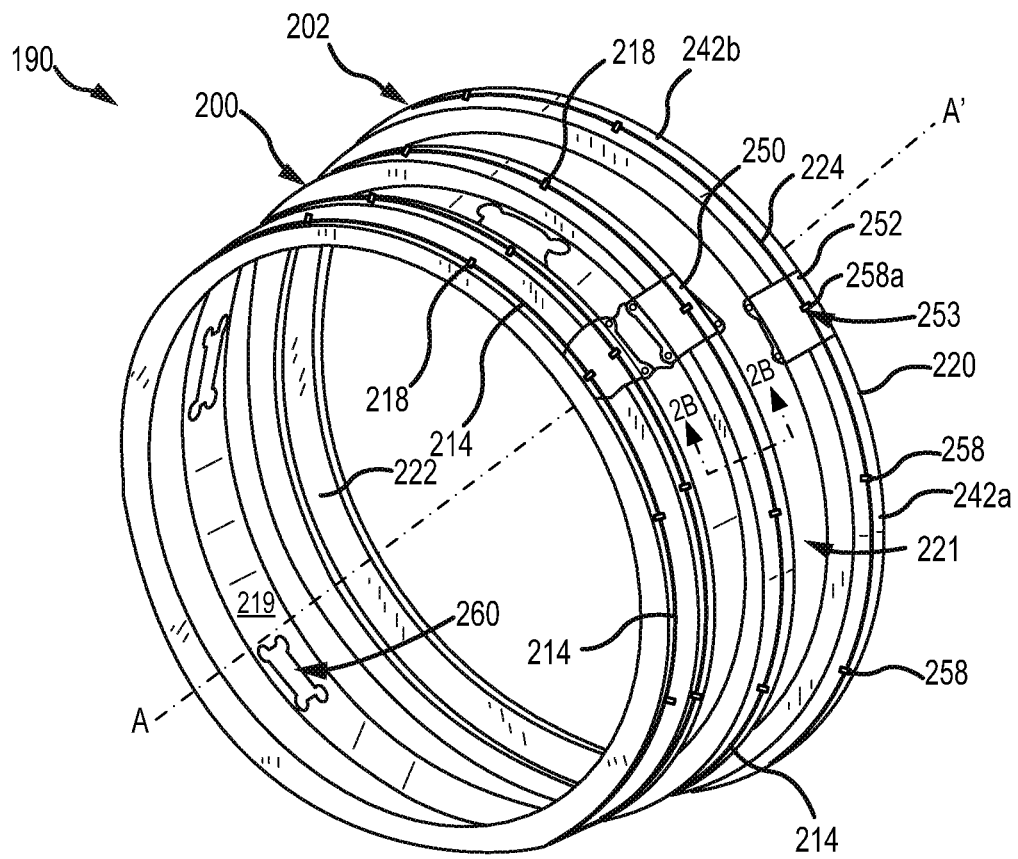
FIG. 2A illustrates a perspective view of a conformal heat shield for a compressor section of the gas turbine engine of FIG. 1, in accordance with various embodiments.

FIG. 2A illustrates a perspective view of a conformal heat shield 190, in accordance with various embodiments. Conformal heat shield 190 may include a first section 200 and a second section 202. First section may be spaced an axial distance 221 from first section 200. When installed on gas turbine engine 20, first section 200 may be located forward of second section 202.

Figure 2B:
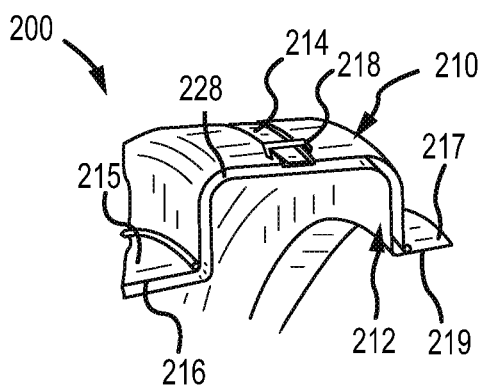
FIG. 2B illustrates a cross-sectional view of a portion of the conformal heat shield of FIG. 2A, in accordance with various embodiments.

FIG. 2B illustrates a cross-sectional view of first section 200 take along the line 2B-2B in FIG. 2A. First section 200 may include a distal metal layer 210 and a proximal metal layer 212. Distal metal layer 210 may be located radially outward of proximal metal layer 212. Distal metal layer 210 and proximal metal layer 212 may each comprise a flexible metal sheet or metal foil. Distal metal layer 210 and proximal metal layer 212 may comprise a nickel based alloy or super alloy, titanium, aluminum, stainless steel, or any other metal or metal alloy. In various embodiments, a radial thickness of distal metal layer 210, as measured from a radially outward surface 215 to a radially inward surface 216 of distal metal layer 210, may be between 0.002 inches and 0.012 inches (i.e., between 0.051 mm and 0.305 mm). In various embodiments, the radial thickness of distal metal layer 210, may be between 0.004 inches and 0.008 inches (i.e., 0.102 mm and 0.2032 mm). In various embodiments, a radial thickness of proximal metal layer 212, as measured from a radially outward surface 217 to a radially inward surface 219 of proximal metal layer 212, may be equal to the radial thickness of distal metal layer 210.

An insulating material 228 may be located between distal metal layer 210 and proximal metal layer 212. Insulating material 228 may comprise wool paper, high surface area (HSA) paper containing high surface area fibers encapsulated between layers of woven textile, a composite material, air, or other thermally insulating material.

With combined reference to FIGS. 2A and 2B, a plurality of loops 218 may extend radially outward from distal metal layer 210. One or more straps 214 may be located through loops 218. Straps 214 may be tightened (i.e., a circumference of straps 214 may be decreased) to securely couple first section 200 of conformal heat shield 190 to a case structure (e.g., to compressor case 100 in FIG. 3).

Figure 3:
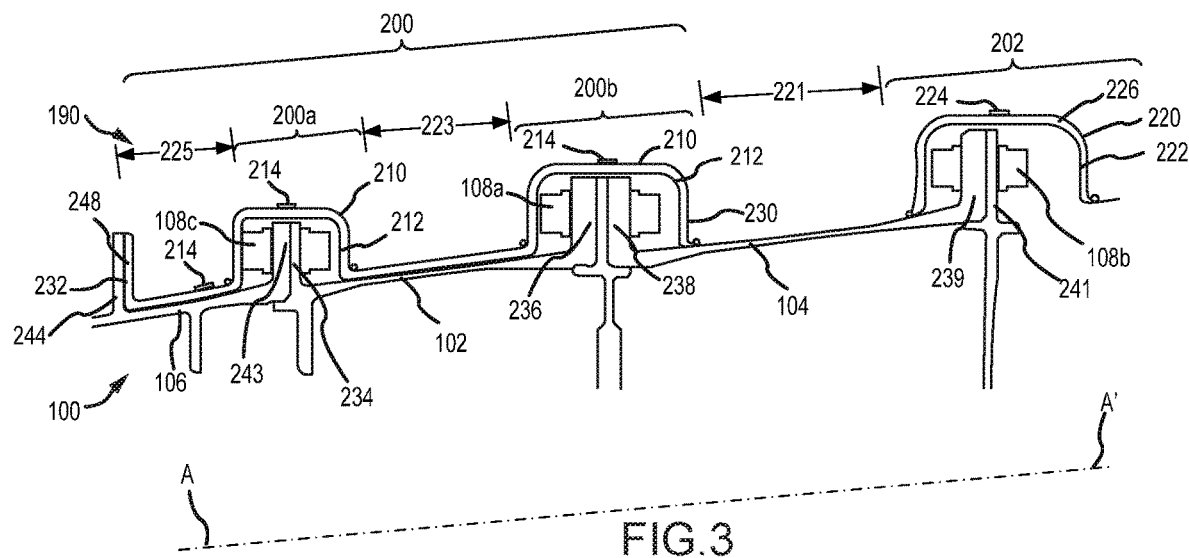
FIG. 3 illustrates a cross-section view of a section of a gas turbine engine having a conformal heat shield, in accordance with various embodiments.

With reference to FIG. 3, a cross-section view of conformal heat shield 190 coupled to compressor case 100 is illustrated, in accordance with various embodiments. Second section 202 of conformal heat shield 190 may include a distal metal layer 220 and a proximal metal layer 222. Distal metal layer 220 may be located radially outward of proximal metal layer 222. Distal metal layer 220 and proximal metal layer 222 may each comprise a flexible metal sheet or metal foil. Distal metal layer 220 and proximal metal layer 222 may comprise a nickel based alloy or super alloy, titanium, aluminum, stainless steel, or any other metal or metal alloy. In various embodiments, a radial thickness of distal metal layer 220, as measured from a radially outward surface to a radially inward surface of distal metal layer 220, may be between 0.002 inches and 0.012 inches (i.e., between 0.051 mm and 0.305 mm). In various embodiments, the radial thickness of distal metal layer 220, may be between 0.004 inches and 0.008 inches (i.e., 0.102 mm and 0.2032 mm). In various embodiments, a radial thickness of proximal metal layer 222, as measured from a radially outward surface to a radially inward surface of proximal metal layer 222, may be equal to the radial thickness of distal metal layer 220. An insulating material 226, similar to insulating material 228 may be located between distal metal layer 220 and proximal metal layer 222.

With combined reference to FIG. 2A and FIG. 3, a plurality of loops 258 may extend radially outward from distal metal layer 220 of second section 202. One or more straps 224 may be located through loops 258. Straps 224 may be tightened (i.e., a circumference of straps 224 may decreased) to securely couple second section 202 of conformal heat shield 190 to a case structure (e.g., to compressor case 100)

Returning to FIG. 3, in various embodiments, compressor case 100 may include a plurality of axially adjacent case sections, for example, a first case section 102 which is axially adjacent to a second case section 104 and a third case section 106. First case section 102 may be forward of second case section 104, and aft of third case section 106. First case section 102 may include radially extending flanges 234 and 236. Radially extending flange 234 may be located at a forward end of first case section 102. Radially extending flange 236 may be located at an aft end of the first case section 102. Second case section 104 may include radially extending flanges 238 and 239. Radially extending flange 238 may be located at a forward end of second case section 104. Radially extending flange 239 may be located at an aft end of second case section 104. Third case section 106 may include radially extending flanges 243 and 244. Radially extending flange 243 may be located at an aft end of third case section 106. Radially extending flange 244 may be located forward of radially extending flange 243. In various embodiments, radially extending flange 244 may be located adjacent to and/or in contact with a radially extending flange 248 of first section 200. Radially extending flange 248 may be located at a forward end 232 of first section 200 of conformal heat shield 190.

A fastener 108a, for example, a rivet, nut and bolt, screw, clip, or other suitable securement device, may be located through radially extending flanges 236 and 238, and may secure radially extending flange 236 to radially extending flange 238. A fastener 108b may be located through radially extending flange 239 and an aft attachment flange 241, and may secure radially extending flange 240 to aft attachment flange 241. A fastener 108c may be located through radially extending flanges 234 and 243, and may secure radially extending flange 234 to radially extending flange 243.

First section 200 may include a forward raised portion 200a located over fastener 108c and radially extending flanges 234 and 243, and an aft raised portion 200b located over fastener 108a radially extending flanges 236 and 248. Forward raised portion 200a may be located axially between channel portions 223 and 225 of first section 200. Forward raised portion 200a may be distal to (i.e., extend radially outward from) channel portions 223 and 225. Channel portion 223 may extend axially from forward raised portion 200a to aft raised portion 200b.

In various embodiments, the distal metal layers (i.e., distal metal layers 210 and 220) of forward raised portion 200a, aft raised portion 200b, and second section 202 may form two radially extending surfaces connected by an axially extending surface.

Figure 5A:
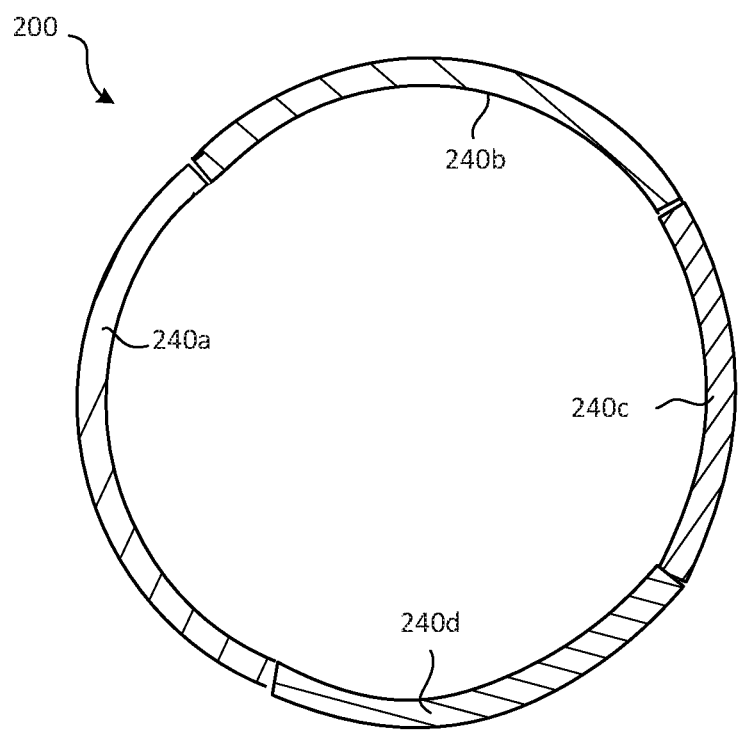
FIGS. 5A and 5B illustrate arcuate segments of a conformal heat shield, in accordance with various embodiments.

With reference to FIG. 5A, first section 200 may be formed of a plurality of arcuate segments 240. Said differently, first section 200 may include a plurality of arcuate segments, (e.g., a first arcuate segment 240a, a second arcuate segment 240b, a third arcuate segment 240c, and a fourth arcuate segment 240d) located circumferentially about axis A-A' (FIG. 2A). Arcuate segments 240 form a generally annular structure, extending 360° around axis A-A'. Each of the arcuate segments 240 includes, with momentary reference to FIG. 2B, distal metal layer 210, proximal metal layer 212, and insulating material 228.

Figure 5B:
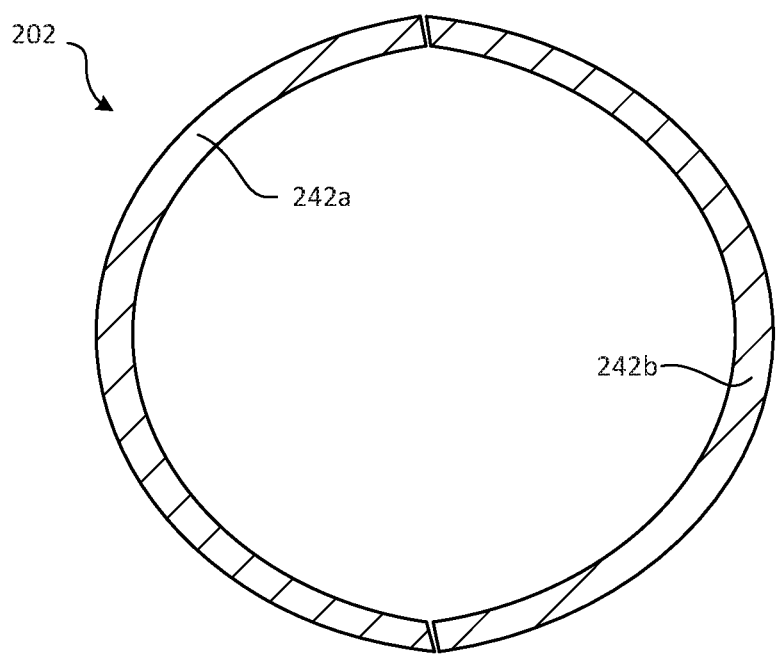

With reference to FIG. 5B, second section 202 may be formed of a plurality of arcuate segments 242. Said differently, second section 202 may include a plurality of arcuate segments, (e.g., a first arcuate segment 242a, and a second arcuate 242b) located circumferentially about axis A-A', with momentary reference to FIG. 2A. Arcuate segments 242 form a generally annular structure, extending 360° around axis A-A'. Each of the arcuate segments 242 includes, with momentary reference to FIG. 3, distal metal layer 220, proximal metal layer 222, and insulating material 226.

Figure 4A:
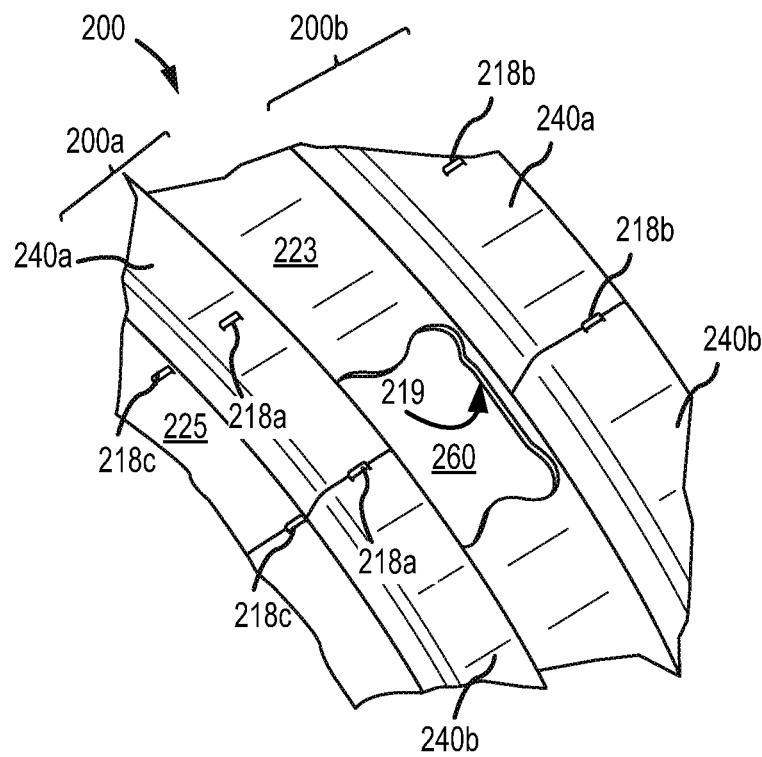
FIG. 4A illustrates a two adjacent arcuate segments of a conformal heat shield, in accordance with various embodiments.

With reference to FIG. 4A, a perspective view of a portion of first section 200 of conformal heat shield 190 is illustrated. First arcuate segment 240a is circumferentially adjacent to second arcuate segment 240b. First loops 218a may be located circumferentially along and may extend radially outward from forward raised portion 200a of arcuate segments 240a and 240b. Second loops 218b may be located circumferentially along and extend radially outward from aft raised portion 200b of arcuate segments 240a and 240b. Third loops 218c may be located circumferentially along and extend radially outward from channel portion 225 of arcuate segments 240a and 240b. In various embodiments, channel portion 223 of first section 200 may define a plurality of heat shield openings 260 (one shown).

Figure 4B:
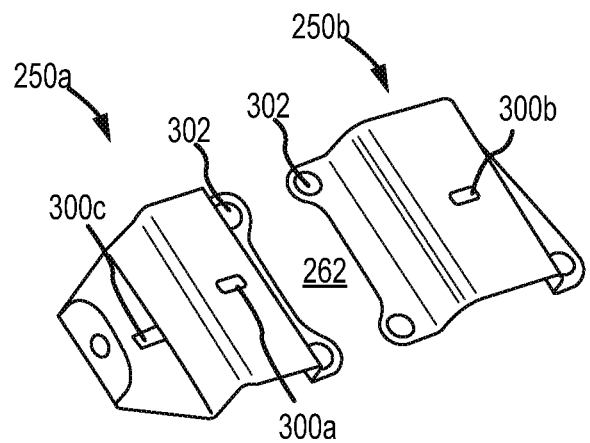
FIG. 4B illustrates a coupling bracket for a conformal heat shield, in accordance with various embodiments.

With reference to FIG. 4B, a coupling bracket 250 is illustrated, in accordance with various embodiments. Coupling bracket 250 may include a first portion 250a and a second portion 250b. First portion 250a may define a first loop orifice 300a and a third loop orifice 300c. First loop orifice 300a may be configured to receive a first loop 218a (with momentary reference to FIG. 4A). Third loop orifice 300c may be configured to receive a third loop 218c (with momentary reference to FIG. 4A). Second portion 250b may define a second loop orifice 300b. Second loop orifice 300b may be configured to receive a second loop 218b (with momentary reference to FIG. 4A). First portion 250a and second portion 250b may each further include and define a plurality of fastener openings 302. A coupling bracket opening 262 may be at least partially defined by first portion 250a and second portion 250b.

Figure 4C:
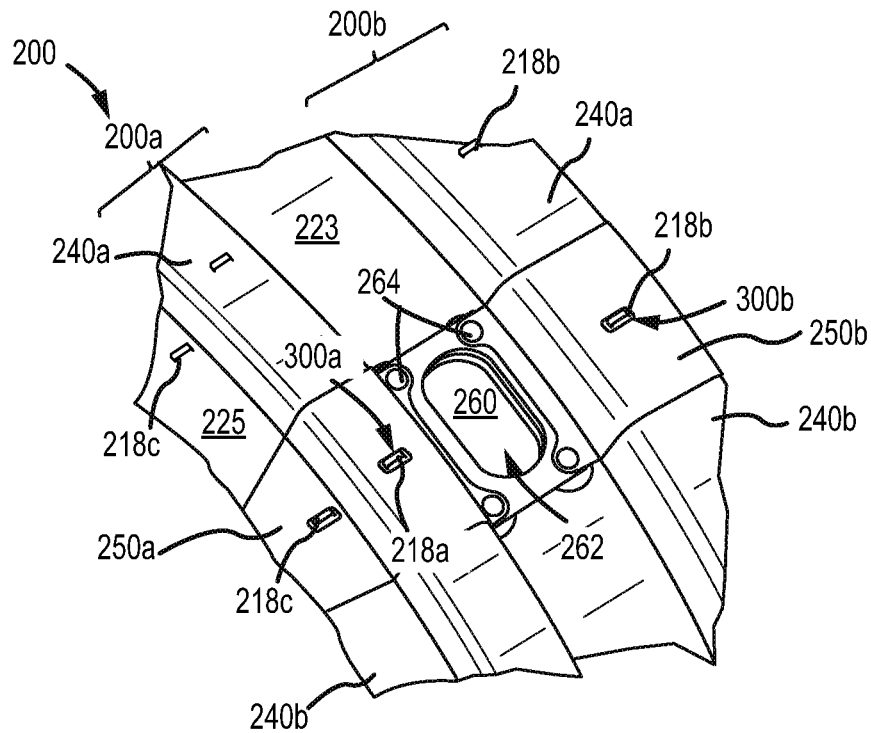
FIG. 4C illustrates the coupling bracket of FIG. 4B located over the adjacent arcuate segments of FIG. 4A, in accordance with various embodiments.

With reference to FIG. 4C, first section 200 is illustrated with coupling bracket 250 located over first arcuate segment 240a and second arcuate segment 240b. Fasteners 264 may mount coupling bracket 250 to first arcuate segment 240a and second arcuate segment 240b. Coupling bracket opening 262 may be located over heat shield opening 260. First loop 218a may be located through first loop orifice 300a. A second loop 218b may be located through second loop orifice 300b. A third loop 218c may be located through third loop orifice 300c. Coupling brackets 250 may be located over the circumferential seams between adjacent arcuate segments 240. For example, a first section 200 comprising four arcuate segments 240 will have four circumferential seams and thus four coupling brackets 250, with a coupling brackets 250 covering each of the circumferential seams.

Figure 4D:
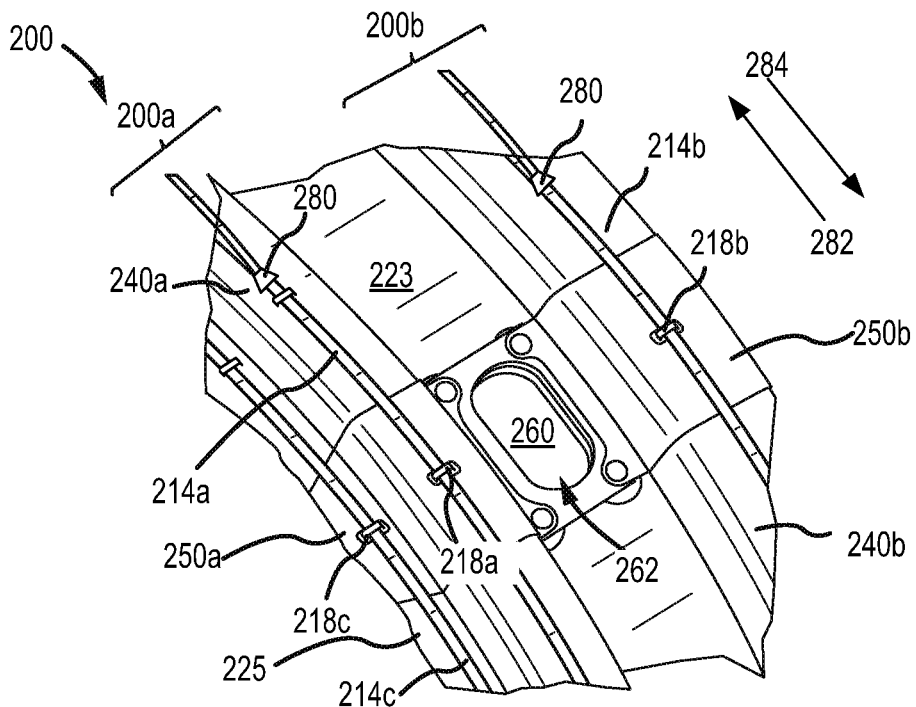
FIG. 4D illustrates a strap securing the coupling bracket and the arcuate segments of a conformal heat shield, in accordance with various embodiments.

With reference to FIG. 4D, and in accordance with various embodiments, a first strap 214a may be located over first portion 250a of coupling bracket 250 and through first loops 218a forward raised section 200a. A second strap 214b may be located over second portion 250b of coupling bracket 250 and through second loops 218b of aft raised portion 200b. is illustrated with coupling bracket 250 located over first arcuate segment 240a and second arcuate segment 240b. A third strap 214c may be located over first portion 250a of coupling bracket 250 and through third loops 218c of channel portion 225. is illustrated with coupling bracket 250 located over first arcuate segment 240a and second arcuate segment 240b. Straps 214a, 214b, and 214c may each comprise a fastener 280. Fasteners 280 may be configured to allow straps 214a, 214b, and 214c to translate through fasteners 280 in a first direction 282 and prevent straps 214a, 214b, and 214c from translating through fasteners 280 in a second direction 284. Second direction 284 is generally opposite first direction 282. Straps 214a, 214b, and 214c couple arcuate segments 240 of first section 200 together, and may secure first section 200 to compressor case 100 (with momentary reference to FIG. 3).

With reference to FIG. 2A, and in accordance with various embodiments, one or more coupling brackets 252 may be located over first arcuate segment 242a and second arcuate segment 242b of second section 202. Coupling bracket 252 may define a loop orifice 253 configured to receive loops 258 of second section 202. A loop 258a may be located through loop orifice 253. Strap 224 may be located radially outward of coupling bracket 252 and through loops 258. Coupling brackets 252 may be located over the circumferential seams between adjacent arcuate segments 242. For example, a second section 202 comprising two arcuate segments 242 will have two circumferential seams and thus two coupling brackets 252, with a coupling brackets 252 covering each of the circumferential seams. In various embodiments, strap 224 may comprise a fastener, similar to fasteners 280 in FIG. 4D. Strap 224 may couple arcuate segments 242a and 242b of second section 202 together, and may secure second section 202 to compressor case 100 (with momentary reference to FIG. 3).

With reference to FIG. 3, conformal heat shield 190 may be uniformly spaced over the exterior compressor case 100, such uniformity may improve thermal control of compressor case 100. Improved thermal control tends to increase control and accuracy of interior rotors and stator air seal clearances, which may improve engine performance and operability. Conformal heat shield 190 may also be lighter weight than traditional all-metal heat shield. The layered construction of conformal heat shield 190 (e.g., distal metal layer 210, insulating material 228, and proximal metal layer 212) may allow conformal heat shield 190 to self-damp, which may reduce fatigue failures. Further, the loop and strap attachment mechanism of conformal heat shield 190 tends to simplify installation and removal process, as compared to current heat shield which generally employ numerous bolts. The materials employed in conformal heat shield 190 may reduce maintenance cost as the costs of the materials of conformal heat shield may be relatively low, making replacing, rather than repairing, a more cost and time effective solution. Finally, the multi-layer construction of conformal heat shield may lends itself to tailoring the thermal resistance at any location, where an adjustment may be required, or if engine operation conditions are revised. For example, a material or thickness of the insulating materials 226, 228 may be adjusted, as opposed to redesigning the entire heat shield and/or the forming tools employed to manufacture traditional all metal heat shields.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A conformal heat shield for a gas turbine engine, comprising:
    a first section including a first arcuate segment and a second arcuate segment circumferentially adjacent to the first arcuate segment, wherein the first arcuate segment of the first section and the second arcuate segment of the first section each comprises:
        a first distal metal layer including a plurality of loops extending radially outward from the first distal metal layer;
        a first proximal metal layer located radially inward of the first distal metal layer; and
        an insulating material located between the first distal metal layer and the first proximal metal layer; and
    a first strap located through the plurality of loops.

2. The conformal heat shield of claim 1, further comprising a coupling bracket located over the first arcuate segment and the second arcuate segment.

3. The conformal heat shield claim 2, wherein the coupling bracket defines a first loop orifice, and wherein a first loop of the plurality of loops is located through the first loop orifice.

4. The conformal heat shield of claim 3, wherein the coupling bracket comprises:
a first portion located over a forward portion of the first section, the first portion defining the first loop orifice; and
a second portion located over an aft portion of the first section, the second portion defining a second loop orifice, wherein the aft portion of the first section includes a plurality of aft loops extending radially outward from the first distal metal layer, and wherein a first aft loop of the plurality of aft loops is located through the second loop orifice.

5. The conformal heat shield of claim 4, further comprising a second strap located over the second portion of the coupling bracket and through the first aft loop.

6. The conformal heat shield of claim 4, wherein the first portion of the coupling bracket and the second portion of the coupling bracket define, at least a portion of a coupling bracket opening, and wherein the coupling bracket opening is located over a heat shield opening defined by the first arcuate segment and the second arcuate segment.

7. The conformal heat shield of claim 1, further comprising:
a second section located aft of the first section, the second section including a first arcuate segment and a second arcuate segment circumferentially adjacent to the first arcuate segment of the second section, wherein the first arcuate segment of the second section and the second arcuate segment of the second section each comprises:
a second distal metal layer including a plurality of second loops extending radially outward from the second distal metal layer;
a second proximal metal layer located radially inward of the second distal metal layer; and
a second insulating material located between the second distal metal layer and the second proximal metal layer; and
a second strap located through the plurality of second loops.

8. The conformal heat shield of claim 7, wherein the first arcuate segment of the first section and the second arcuate segment of the first section define a radially extending flange located at a forward end of the first section.

9. A compressor section of a gas turbine engine comprising:
a compressor case comprising:
a first case section including a first radially extending flange located at a forward end of the first case section and a second radially extending flange located at an aft end of the first case section;
a second case section aft of the first case section and including a third radially extending flange located at a forward end of the second case section;
a first fastener located through the first radially extending flange; and
a second fastener located through the second radially extending flange of the first case section and the third radially extending flange of the second case section;
a conformal heat shield located radially outward of the compressor case, the conformal heat shield including a first section comprising a first arcuate segment and a second arcuate segment circumferentially adjacent to the first arcuate segment, wherein the first arcuate segment of the first section and the second arcuate segment of the first section each comprises:
a first distal metal layer including a plurality of loops extending radially outward from the first distal metal layer;
a first proximal metal layer located radially inward of the first distal metal layer; and
a first insulating material located between the first distal metal layer and the first proximal metal layer; and
a first strap located through the plurality of loops.

10. The compressor section of claim 9, further comprising a coupling bracket located over the first arcuate segment and the second arcuate segment.

11. The compressor section of claim 10, wherein the coupling bracket defines a first loop orifice, and wherein a first loop of the plurality of loops is located through the first loop orifice.

12. The compressor section of claim 11, wherein the coupling bracket comprises:
a first portion located over a forward raised portion of the first section, the first portion defining the first loop orifice; and
a second portion located over an aft raised portion of the first section, the second portion defining a second loop orifice, wherein the aft raised portion of the first section includes a plurality of aft loops extending radially outward from the first distal metal layer, and wherein a first aft loop of the plurality of aft loops is located through the second loop orifice.

13. The compressor section of claim 12, further comprising a second strap located over the second portion of the coupling bracket and through the first aft loop.

14. The compressor section of claim 9, wherein the conformal heat shield further comprises:
a second section located aft of the first section, the second section including a first arcuate segment and a second arcuate segment circumferentially adjacent to the first arcuate segment of the second section, wherein the first arcuate segment of the second section and the second arcuate segment of the second section each comprises:
a second distal metal layer including a plurality of second loops extending radially outward from the second distal metal layer;
a second proximal metal layer located radially inward of the second distal metal layer; and
a second insulating material located between the second distal metal layer and the second proximal metal layer; and
a second strap located through the plurality of second loops.

15. The compressor section of claim 14, wherein the second section of the conformal heat shield is located radially outward of a fourth radially extending flange of the second case section, wherein the fourth radially extending flange is located at an aft end of the second case section.

16. A gas turbine engine, comprising
a case structure disposed around a longitudinal axis of the gas turbine engine;
a conformal heat shield located radially outward of the case structure, wherein a first section of the conformal heat shield comprises:
a first distal metal layer including plurality of loops extending radially outward from the first distal metal layer;

a first proximal metal layer located radially inward of the first distal metal layer; and a first insulating material located between the first distal metal layer and the first proximal metal layer; and a first strap located through the plurality of loops.

17. The gas turbine engine of claim 16, further comprising a fastener coupled to the first strap, wherein the fastener is configured to allow the first strap to translate through the fastener in a first direction and prevent the first strap from translating through the fastener in a second direction opposite the first direction.

18. The gas turbine engine of claim 16, wherein the conformal heat shield further comprises:

a second section located aft of the first section, the second section comprising:

a second distal metal layer including a plurality of second loops extending radially outward from the second distal metal layer;

a second proximal metal layer located radially inward of the second distal metal layer; and a second insulating material located between the second distal metal layer and the second proximal metal layer; and a second strap located through the plurality of second loops.

19. The gas turbine engine of claim 18, further comprising a compressor, and wherein the case structure is located radially outward of the compressor.

20. The gas turbine engine of claim 16, wherein the first section of the conformal heat shield comprises:

a forward raised portion;

an aft raised portion; and a channel portion extending axially between the forward raised portion and the aft raised portion, and wherein the forward raised portion and the aft raised portion are distal to the channel portion.

* * * * *